US012763545B2

(12) United States Patent
Fu et al.

(10) Patent No.: US 12,763,545 B2
(45) Date of Patent: Oct. 13, 2026

(54) GAIN ADJUSTMENT METHOD AND OPTICAL FIBER AMPLIFIER

(71) Applicants: ACELINK TECHNOLOGIES CO., LTD., Wuhan City (CN); ACCELINK ELECTRONIC TECHNOLOGY CO., LTD., Wuhan City (CN)

(72) Inventors: Chengpeng Fu, Wuhan City (CN); Zhi Chen, Wuhan City (CN); Li Xiao, Wuhan City (CN); Qing Liu, Wuhan City (CN); Menghui Le, Wuhan City (CN); Chunping Yu, Wuhan City (CN)

(73) Assignees: ACCELINK TECHNOLOGIES CO., LTD, Wuhan City (CN); ACCELINK ELECTRONIC TECHNOLOGY CO., LTD., Wuhan City (CN)

( * ) Notice: Subject to any disclaimer, the term of this patent is extended or adjusted under 35 U.S.C. 154(b) by 682 days.

(21) Appl. No.: 18/033,042

(22) PCT Filed: Dec. 22, 2020

(86) PCT No.: PCT/CN2020/138418
§ 371 (c)(1),
(2) Date: Apr. 20, 2023

(87) PCT Pub. No.: WO2022/082986
PCT Pub. Date: Apr. 28, 2022

(65) Prior Publication Data

US 2023/0402814 A1 Dec. 14, 2023

(30) Foreign Application Priority Data

Oct. 23, 2020 (CN) ......................... 202011147506.7

(51) Int. Cl.
*H01S 3/00* (2006.01)
*H01S 3/067* (2006.01)
(Continued)

(52) U.S. Cl.
CPC ........ *H01S 3/1301* (2013.01); *H01S 3/06754* (2013.01); *H01S 3/10069* (2013.01); *H01S 3/1305* (2013.01)

(58) Field of Classification Search
CPC ............... H01S 3/1301; H01S 3/06754; H01S 3/10069; H01S 3/1305
See application file for complete search history.

(56) References Cited

U.S. PATENT DOCUMENTS 6,275,329 B1 8/2001 Sieben
6,421,169 B1 7/2002 Bonnedal et al.
(Continued)

FOREIGN PATENT DOCUMENTS

CN 1219043 A 6/1999
CN 1247655 A 3/2000
(Continued)

OTHER PUBLICATIONS

International Search Report of PCT/CN2020/138418 filed Dec. 22, 2020.
(Continued)

*Primary Examiner* — Mark Hellner
(74) *Attorney, Agent, or Firm* — Chang & Hale LLP

(57) ABSTRACT

Disclosed are a gain adjustment method and an optical fiber amplifier. The gain adjustment method is applied to an optical fiber amplifier at least including a gain medium, a dynamic gain equalizer and a control unit. The method is performed by the control unit, and includes: determining a property parameter of the gain medium and a current attenuation spectrum of the dynamic gain equalizer; determining, in a preset gain attenuation-spectrum library, a gain attenuation-spectrum mapping table corresponding to the property parameter, wherein the gain attenuation-spectrum mapping table includes a mapping relationship between each gain of
(Continued)

the optical fiber amplifier and one attenuation spectrum of the dynamic gain equalizer; obtaining a target gain of the optical fiber amplifier; determining a target attenuation spectrum in the gain attenuation-spectrum mapping table according to the target gain; and adjusting the current attenuation spectrum to the target attenuation spectrum.

10 Claims, 7 Drawing Sheets

(51) Int. Cl.
*H01S 3/10* (2006.01)
*H01S 3/13* (2006.01)

(56) References Cited

U.S. PATENT DOCUMENTS

| | | | | |
|---|---|---|---|---|
| 6,900,931 | B1 | 5/2005 | Sridhar et al. | |
| 7,145,718 | B2 * | 12/2006 | Sugaya | H04B 10/2916 359/341.41 |
| 2003/0081892 | A1 * | 5/2003 | Ghera | H01S 3/06758 359/341.1 |
| 2003/0113058 | A1 | 6/2003 | Stayt | |
| 2004/0019459 | A1 * | 1/2004 | Dietz | G01M 11/335 702/184 |
| 2009/0052015 | A1 * | 2/2009 | Wang | H01S 3/06754 359/337.1 |
| 2009/0083353 | A1 | 3/2009 | Koster et al. | |
| 2013/0004181 | A1 | 1/2013 | Juarez et al. | |
| 2019/0131758 | A1 | 5/2019 | Tao et al. | |
| 2021/0344163 | A1 | 11/2021 | Zhang et al. | |

FOREIGN PATENT DOCUMENTS

| | | | |
|---|---|---|---|
| CN | 1419354 | A | 5/2003 |
| CN | 1469180 | A | 1/2004 |
| CN | 101374025 | A | 2/2009 |
| CN | 105871468 | A | 8/2016 |
| CN | 106299992 | A | 1/2017 |
| CN | 106842764 | A | 6/2017 |
| CN | 107968682 | A | 4/2018 |
| CN | 109103741 | A | 12/2018 |
| EP | 3300190 | A1 | 3/2018 |

OTHER PUBLICATIONS

Written Opinion of the International Searching Authority of PCT/CN2020/138418 filed Dec. 22, 2020.

Search Report of Chinese Priority Application CN202011147506.7 filed Oct. 23, 2020.

Extended European Search Report, dated Sep. 19, 2024, of the counterpart application EP20958560.3.

* cited by examiner

GAIN ADJUSTMENT METHOD AND OPTICAL FIBER AMPLIFIER

CROSS-REFERENCE TO RELATED APPLICATION(S)

The present disclosure is proposed on the basis of a Chinese patent application No. 202011147506.7 filed on Oct. 23, 2020, and claims the priority of this Chinese patent application, the disclosure of which is hereby incorporated by reference herein in its entirety.

TECHNICAL FIELD OF THE DISCLOSURE

The present disclosure relates to the technical field of optical communication, and relates to but not limited to a gain adjustment method and an optical fiber amplifier.

BACKGROUND

In Internet Data Centers (IDC) and Reconfigurable Optical ADD/Drop Multiplexer (ROADM) systems, a gain adjustable optical fiber amplifier with a low noise figure becomes one of the indispensable devices. Erbium-Doped optical fiber Amplifiers (EDFA) have been widely used in communication systems.

At present, the gain adjustment of EDFA is realized by a built-in variable optical attenuator (VOA). In a case of adjusting a gain, a gain setting value+an attenuation value of the VOA=a fixed gain; in a case of a less gain setting value, the attenuation value of the VOA will be greater; and in a case of a maximum gain setting value, the attenuation value of the VOA will be 0. As a result, the attenuation variation range of the VOA will also be greater when the gain adjustment range is greater. However, an excessive range of the attenuation value of the VOA will reduce the output power and increase the pump current of the EDFA on the one hand, and will deteriorate the noise figure of the EDFA on the other hand.

SUMMARY

In view of the above, embodiments of the present disclosure provide a gain adjustment method and an optical fiber amplifier, which may solve the problems in the related art of noise figure degradation and pump conversion efficiency reduction caused by excessive attenuation of the VOA during the gain adjustment process.

The technical solutions of the embodiments of the present disclosure are implemented as follows:

An embodiment of the present disclosure provides a gain adjustment method which is applied to an optical fiber amplifier at least comprising a gain medium, a dynamic gain equalizer, and a control unit, wherein the method is performed by the control unit and comprises: determining a property parameter of the gain medium and a current attenuation spectrum of the dynamic gain equalizer; determining, from a preset gain attenuation-spectrum library, a gain attenuation-spectrum mapping table corresponding to the property parameter, wherein the gain attenuation-spectrum mapping table includes a mapping relationship between each gain of the optical fiber amplifier and one attenuation spectrum of the dynamic gain equalizer; obtaining a target gain of the optical fiber amplifier; determining a target attenuation spectrum in the gain attenuation-spectrum mapping table according to the target gain; and adjusting the current attenuation spectrum to the target attenuation spectrum.

In some embodiments, the determining the target attenuation spectrum in the gain attenuation-spectrum mapping table according to the target gain comprises: determining an attenuation spectrum corresponding to the target gain in the gain attenuation-spectrum mapping table as the target attenuation spectrum in a case that the target gain can be found in the gain attenuation-spectrum mapping table.

In some embodiments, the determining the target attenuation spectrum in the gain attenuation-spectrum mapping table according to the target gain comprises: determining a position of the target gain in the gain attenuation-spectrum mapping table in a case that the target gain cannot be found in the gain attenuation-spectrum mapping table; obtaining at least one adjacent gain adjacent to the target gain and an attenuation spectrum corresponding to each adjacent gain according to the position of the target gain; determining the target attenuation spectrum corresponding to the target gain by using an interpolation method according to the at least one adjacent gain and the attenuation spectrum corresponding to each adjacent gain.

In some embodiments, the determining the target attenuation spectrum corresponding to the target gain by using an interpolation method according to the at least one adjacent gain and the attenuation spectrum corresponding to each adjacent gain comprises: determining at least one operating wavelength of the attenuation spectrum corresponding to each adjacent gain and an attenuation value corresponding to each operating wavelength; determining an average value of the attenuation values corresponding to different attenuation spectrums at a same operating wavelength as a target attenuation value of the target attenuation spectrum at the corresponding operating wavelength; determining the target attenuation spectrum corresponding to the target gain according to the target attenuation value at each operating wavelength.

In some embodiments, the determining the property parameter of the gain medium comprises: obtaining length, material or a doping type of the gain medium; determining the length, the material or the doping type of the gain medium as the property parameter of the gain medium.

In some embodiments, the obtaining length of the gain medium comprises: obtaining a first attenuation value at a minimum operating wavelength of the current attenuation spectrum, and a second attenuation value at a maximum operating wavelength of the current attenuation spectrum; in a case that an absolute value of a difference between the first attenuation value and the second attenuation value is less than a threshold value, determining a gain corresponding to the current gain attenuation spectrum as a standard gain, wherein the standard gain is less than a maximum gain of the optical fiber amplifier and is greater than a minimum gain of the optical fiber amplifier; and determining the length of the gain medium according to the standard gain.

In some embodiments, the obtaining length of the gain medium comprises: obtaining a third attenuation value at an attenuation peak in a first wavelength region of the current attenuation spectrum; obtaining a fourth attenuation value at the attenuation peak in a second wavelength region of the current attenuation spectrum, wherein any wavelength in the first wavelength region is less than a minimum wavelength in the second wavelength region; in a case that an absolute value of a difference between the third attenuation value and the fourth attenuation value is less than a threshold value, determining a gain corresponding to the current gain attenuation spectrum as a standard gain, wherein the standard gain is less than a maximum gain of the optical fiber amplifier and is greater than a minimum gain of the optical fiber amplifier; and determining the length of the gain medium according to the standard gain.

In some embodiments, the adjusting the current attenuation spectrum to the target attenuation spectrum comprises: determining the target attenuation value at each operating wavelength of the target attenuation spectrum; adjusting an attenuation value at each operating wavelength of the current attenuation spectrum to the target attenuation value at the corresponding operating wavelength of the target attenuation spectrum, so as to adjust the current attenuation spectrum to the target attenuation spectrum.

In some embodiments, the optical fiber amplifier further comprises: a variable optical attenuator; and the determining the target attenuation spectrum in the gain attenuation-spectrum mapping table according to the target gain comprises: selecting randomly an attenuation spectrum corresponding to a gain in the gain attenuation-spectrum mapping table, wherein the gain corresponding to the selected attenuation spectrum is less than the target gain; determining the selected attenuation spectrum as a first attenuation spectrum; determining a gain difference between the target gain and the gain corresponding to the first attenuation spectrum; determining a second attenuation spectrum of the variable optical attenuator according to the gain difference; determining a sum of the first attenuation spectrum and the second attenuation spectrum as the target attenuation spectrum.

An embodiment of the present disclosure provides an optical fiber amplifier, wherein the optical fiber amplifier at least comprises: a gain medium, a dynamic gain equalizer, and a control unit; an input of the dynamic gain equalizer is connected with the gain medium, and the dynamic gain equalizer is configured to adjust a gain attenuation spectrum of the optical fiber amplifier; and the control unit is connected with the dynamic gain equalizer for determining a property parameter of the gain medium and a current attenuation spectrum of the dynamic gain equalizer; determining, in a preset gain attenuation-spectrum library, a gain attenuation-spectrum mapping table corresponding to the property parameter, wherein the gain attenuation-spectrum mapping table includes a mapping relationship between each gain of the optical fiber amplifier and one attenuation spectrum of the dynamic gain equalization; obtaining a target gain of the optical fiber amplifier; determining a target attenuation spectrum in the gain attenuation-spectrum mapping table according to the target gain; and adjusting the current attenuation spectrum to the target attenuation spectrum.

The gain adjustment method and the optical fiber amplifier provided by the embodiments of the present disclosure can determine a gain attenuation-spectrum mapping table according to property parameters of a gain medium, and determine a target attenuation corresponding to a target gain in the gain attenuation-spectrum mapping table, and adjust the current attenuation spectrum of the dynamic gain equalizer to the target attenuation spectrum, so that the gain of the optical fiber amplifier can be dynamically adjusted without reducing the pump conversion efficiency.

BRIEF DESCRIPTION OF THE DRAWINGS

In the accompanying figures which are not necessarily drawn to scale, like reference numerals may represent like parts in different views. Different instances of similar components may be represented by a like numeral with different letter suffixes may indicate. The figures generally illustrate various embodiments discussed herein by way of example but not limitation.

DETAILED DESCRIPTION

Figure 1A:
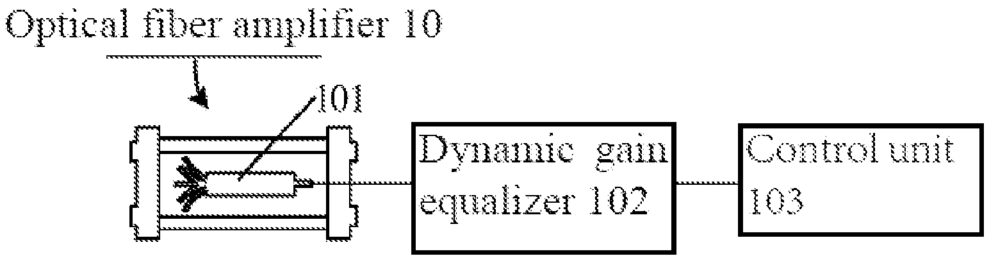
FIG. 1A is an optional schematic structural diagram of an optical fiber amplifier provided by an embodiment of the present disclosure.

In order to make objects, technical solutions and advantages of embodiments of the present disclosure more obvious, the actual technical solutions of the present disclosure will be further described in detail below in conjunction with the accompanying drawings in the embodiments of the present disclosure. The following embodiments are used to explain the present disclosure, but not to limit the present disclosure.

In the following description, the suffixes, such as “module” or “unit”, used to denote elements is only for facilitating the description of the present disclosure, which has no specific meaning by itself. Thus, “module” or “unit” may be used interchangeably.

With the rapid development of big data, Internet of Things and cloud services, more and more scenarios need EDFAs, and need EDFAs to adapt to losses of different spans. On the one hand, the versatility of EDFAs is increased, and on the other hand, terminal customers reduce the material management cost of EDFAs, which requires a wide range of adjustable EDFAs, and the traditional gain adjustment interval can no longer meet the requirements of dynamic reconfigurable networks and IDC communication systems. In the related art, the gain adjustment of EDFAs is realized by a built-in variable optical attenuator VOA. Here, a gain setting value+an attenuation value of the VOA=a fixed gain. In the case that the gain setting value is less, the attenuation value of the VOA will be greater, and in a case that the gain is set to the maximum, the attenuation value of the VOA is 0, so if the gain adjustment range is greater, the VOA attenuation range will also be greater. In fact, this is not a gain-adjustable amplifier in the true sense. The gain produced by this amplifier in the gain medium is fixed. If a certain gain is desired, it is achieved by subtracting an attenuation value of the VOA from the fixed gain. However, the attenuation value of the VOA reduces the output power and increases the pumping current of EDFA on the one hand, and degrades the noise figure of EDFA on the other hand. For an ultra-great dynamic range gain adjustable EDFA, an optical path is split into two parts by an optical switch, one part of which is used to adjust a small gain range, and the other part of which is used to adjust a great gain range. In this case, it is equivalent to two amplifiers; for example, for an adjustable amplifier with a gain range of 10 dB to 30 dB, it may split an adjustable amplifier gain range into a small gain range from 10 dB to X dB and a great gain range from X+2 dB to 30 dB, wherein the gain X dB is greater than a minimum gain 10 dB of the adjustable optical amplifier, but it is less than a maximum gain 30 dB of the adjustable optical amplifier. At this time, the optical path of the adjustable optical amplifier is physically discontinuous, and when switching between the small gain range and the great gain range, the adjustable optical amplifier may cause service light to be cut off.

Based on the above-mentioned problems existing in the related art, an embodiment of the present disclosure provides a gain adjustment method, which is applied to an optical fiber amplifier, capable of solving the problems of the optical fiber amplifier in the prior art due to noise-figure deterioration and pump-conversion-efficiency reduction caused by excessive attenuation of the VOA during the gain adjustment process.

Figure 1B:
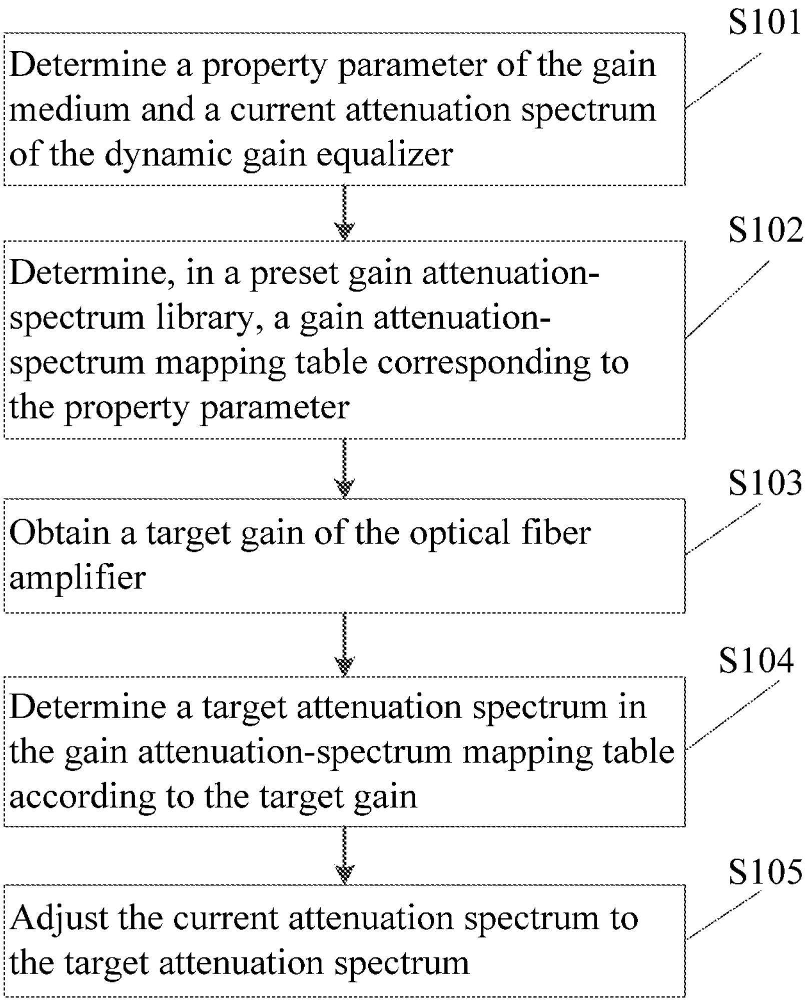
FIG. 1B is an optional schematic flowchart of a gain adjustment method provided by an embodiment of the present disclosure.

An embodiment of the present disclosure provides a gain adjustment method, which is applied to an optical fiber amplifier which may be an erbium-doped optical fiber amplifier, a thulium-doped optical fiber amplifier, or a praseodymium-doped optical fiber amplifier. As shown in FIG. 1A, which is an optional schematic structural diagram of an optical fiber amplifier provided by an embodiment of the present disclosure, the optical fiber amplifier 10 at least includes: a gain medium 101, a dynamic gain equalizer 102 and a control unit 103, wherein the dynamic gain equalizer 102 is connected with the gain medium 101, and the dynamic gain equalizer is used to adjust a gain attenuation spectrum of the optical fiber amplifier 10; the control unit 103 is connected with the dynamic gain equalizer 102, and the control unit 103 is used to determine a property parameter of the gain medium 101 and a current attenuation spectrum of the dynamic gain equalizer 102; determine, in a preset gain attenuation-spectrum library, a gain attenuation-spectrum mapping table corresponding to the property parameter, wherein the gain attenuation-spectrum mapping table includes a mapping relationship between each gain of the optical fiber amplifier and one attenuation spectrum of the dynamic gain equalizer; obtain a target gain of the optical fiber amplifier; determine a target attenuation spectrum in the gain attenuation-spectrum mapping table according to the target gain; and adjust the current attenuation spectrum to the target attenuation spectrum. FIG. 1B is an optional schematic flow chart of a gain adjustment method provided by the embodiment of the present disclosure. The method is executed by the control unit 103. As shown in FIG. 1B, the method includes the steps of:

Step S101, determining a property parameter of the gain medium and a current attenuation spectrum of the dynamic gain equalizer.

In an embodiment of the present disclosure, the gain medium refers to an optical fiber or a doped optical fiber, and the property parameter of the gain medium includes but is not limited to: length of the optical fiber, material of the optical fiber, and a type of the doped optical fiber.

Herein, the property parameter of the gain medium may be a pre-input property parameter, or may be a property parameter obtained in a specific manner.

In a case that the optical fiber amplifier comprises a section of gain medium, the dynamic gain equalizer is connected with an output of the gain medium; if the optical fiber amplifier includes two sections of gain medium, the dynamic gain equalizer is located between the two sections of gain medium. The current attenuation spectrum is the spectrum presented by the dynamic gain equalizer of the optical fiber amplifier under a current gain.

In an embodiment of the present disclosure, the current attenuation spectrum of the dynamic gain equalizer is determined by obtaining an attenuation value of the optical fiber amplifier at the current moment and at each operating wavelength.

Step S102, determining, in a preset gain attenuation-spectrum library, a gain attenuation-spectrum mapping table corresponding to the property parameter.

Here, the gain attenuation-spectrum mapping table includes a mapping relationship between each gain of the optical fiber amplifier and one attenuation spectrum of the dynamic gain equalizer. In some embodiments, a gain of 0.25 dB or a gain of 0.5 dB may be set as a step to establish a mapping relationship between the gain and the attenuation spectrum. The preset gain attenuation-spectrum library includes a mapping relationship between each property parameter of the medium and one gain attenuation-spectrum mapping table. In some embodiments, in a case that the property parameter of the gain medium is determined, a gain attenuation-spectrum mapping table corresponding to the property parameter may be determined in the gain attenuation-spectrum library.

Step S103, obtaining a target gain of the optical fiber amplifier.

Herein, the target gain is a gain that needs to be set, and the target gain is less than the maximum gain of the optical fiber amplifier, but is greater than the minimum gain of the optical fiber amplifier; that is, the target gain is any gain between the maximum gain and the minimum gain of the optical fiber amplifier.

Step S104, determining a target attenuation spectrum in the gain attenuation-spectrum mapping table according to the target gain.

In an embodiment of the present disclosure, the mapping relationship between at least one gain and one attenuation spectrum of the dynamic gain equalizer is stored in the gain attenuation-spectrum mapping table. In a case that the target gain is determined, the target attenuation spectrum corresponding to the target gain may be determined in the gain attenuation-spectrum mapping table.

Step S105, adjusting the current attenuation spectrum to the target attenuation spectrum.

In some embodiments, in a case that the target attenuation spectrum corresponding to the target gain is determined, the current attenuation spectrum of the dynamic gain equalizer of the optical fiber amplifier is adjusted to the target attenuation spectrum, so as to adjust the gain of the optical fiber amplifier to the target gain, and then to achieve the adjustment of the gain of the optical fiber amplifier.

In the gain adjustment method provided by the embodiment of the present disclosure, since the gain attenuation-spectrum mapping table may be determined according to the property parameters of the gain medium, and the target attenuation spectrum corresponding to the target gain is determined in the gain attenuation-spectrum mapping table, the current attenuation spectrum of the dynamic gain equalizer is adjusted to the target attenuation spectrum, so that dynamical adjustment of the gain of the optical fiber amplifier may be achieved without reducing the pump conversion efficiency.

Figure 2:
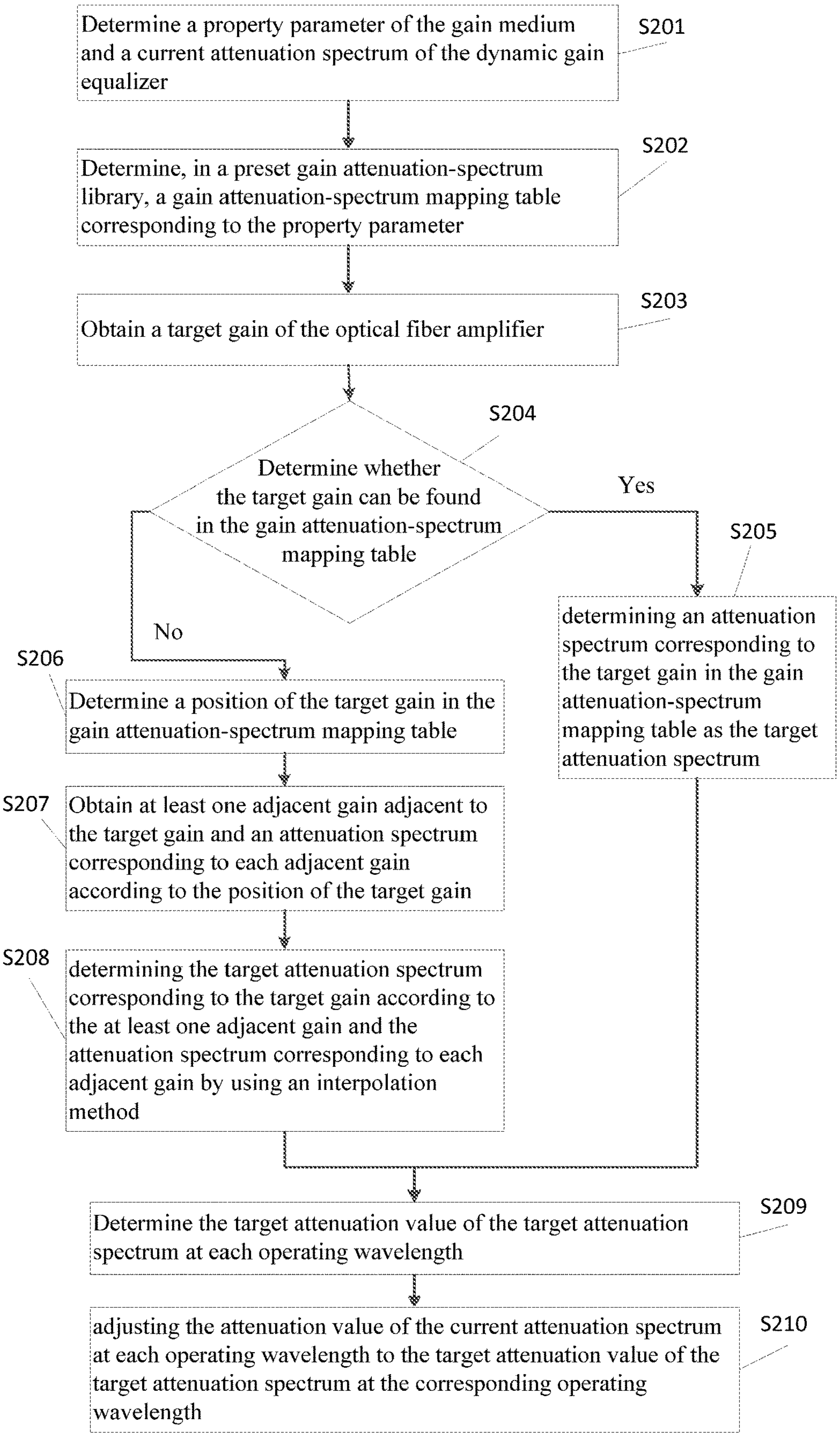
FIG. 2 is an optional schematic flowchart of a gain adjustment method provided by an embodiment of the present disclosure.

An embodiment of the present disclosure provides a gain adjustment method, which is applied to an optical fiber amplifier. The optical fiber amplifier at least includes: a gain medium, a dynamic gain equalizer, and a control unit, and the gain adjustment method is executed by the control unit. FIG. 2 is an optional schematic flowchart of the gain adjustment method provided by the embodiment of the present disclosure. As shown in FIG. 2, the method includes the steps of:

Step S201, determining a property parameter of the gain medium and a current attenuation spectrum of the dynamic gain equalizer.

Step S202, determining, in a preset gain attenuation-spectrum library, a gain attenuation-spectrum mapping table corresponding to the property parameter, wherein the gain attenuation-spectrum mapping table includes a mapping relationship between each gain of the optical fiber amplifier and one attenuation spectrum of the dynamic gain equalizer.

Step S203, obtaining a target gain of the optical fiber amplifier.

The implementation process and the implemented functions of step S201 to step S203 are the same as the implementation process and the implemented functions of step S101 to step S103 in the above embodiment.

Step S204, determining whether the target gain can be found in the gain attenuation-spectrum mapping table.

In some embodiments, since the corresponding relationship between a gain and an attenuation spectrum is stored with a preset step length in the gain attenuation-spectrum mapping table, the target gain may exist in the gain attenuation-spectrum mapping table, and it may also exist between two adjacent gains. In a case that the target gain may be found in the gain attenuation-spectrum mapping table, step S205 is performed; and in a case that the target gain cannot be found in the gain attenuation-spectrum mapping table, step S206 is performed.

Step S205, determining an attenuation spectrum corresponding to the target gain in the gain attenuation-spectrum mapping table as the target attenuation spectrum.

In an embodiment of the present disclosure, in a case that the target gain can be found in the gain attenuation-spectrum mapping table, the attenuation spectrum corresponding to the target gain is determined as the target attenuation spectrum directly by means of table lookup.

Step S206, determining a position of the target gain in the gain attenuation-spectrum mapping table.

Step S207, obtaining at least one adjacent gain adjacent to the target gain and an attenuation spectrum corresponding to each adjacent gain according to the position of the target gain.

Herein, the location of the target gain means that the target gain is located between two adjacent gains in the gain attenuation-spectrum mapping table, or close to a certain gain.

Step S208, determining the target attenuation spectrum corresponding to the target gain according to the at least one adjacent gain and the attenuation spectrum corresponding to each adjacent gain by using an interpolation method.

In an embodiment of the present disclosure, in a case that the target gain cannot be found in the gain attenuation-spectrum mapping table, firstly, a position of the target gain is determined in the gain attenuation-spectrum mapping table; secondly, at least one gain adjacent to the target gain and an attenuation spectrum corresponding to each adjacent gain are obtained according to the position of the target gain; and finally, the target attenuation spectrum corresponding to the target gain is determined according to the at least one adjacent gain and the attenuation spectrum corresponding to each adjacent gain by using an interpolation method.

Herein, the interpolation method estimates an approximate value of a function at some points by utilizing the value status of the function at a limited number of other points. In an embodiment of the present disclosure, there may be a linear relationship between the gains and the attenuation spectrums.

In some embodiments, determining the target attenuation spectrum corresponding to the target gain according to the at least one adjacent gain and the attenuation spectrum corresponding to each adjacent gain with the interpolation method includes:

Step S2081, determining at least one operating wavelength of the attenuation spectrum corresponding to each adjacent gain and an attenuation value corresponding to each operating wavelength.

Step S2082, determining an average value of the attenuation values corresponding to different attenuation spectrums at the same operating wavelength as a target attenuation value of the target attenuation spectrum at the corresponding operating wavelength.

Step S2083, determining the target attenuation spectrum corresponding to the target gain according to the target attenuation value at each operating wavelength.

In an embodiment of the present disclosure, the attenuation value corresponding to each operating wavelength is stored in the attenuation spectrum of the optical fiber amplifier, and the attenuation value of the target attenuation spectrum at the same operating wavelength can be determined according to the average value of the attenuation value at each same operating wavelength of the attenuation spectrum corresponding to the gain adjacent to the target gain, whereby the target attenuation spectrum corresponding to the target gain may be determined.

In some embodiments, in a case that a step length of a gain in the gain attenuation-spectrum mapping table is less than a preset step length, it may be considered that it meets the flatness requirement. In a case that the target gain cannot be found in the gain attenuation-spectrum mapping table, an attenuation spectrum corresponding to any gain adjacent to the target gain may be determined as the target attenuation spectrum corresponding to the target gain. Herein, the preset step length may be 0.5 dB gain.

Step S209, determining the target attenuation value of the target attenuation spectrum at each operating wavelength.

Herein, the target attenuation value of the target attenuation spectrum at each operating wavelength may be obtained by determining the target attenuation spectrum in above steps S205 to S208.

Step S210, adjusting the attenuation value of the current attenuation spectrum at each operating wavelength to the target attenuation value of the target attenuation spectrum at the corresponding operating wavelength.

In an embodiment of the present disclosure, the adjustment of the current attenuation spectrum to the target attenuation spectrum is achieved by adjusting the attenuation value of the current attenuation spectrum at each operating wavelength to the target attenuation value of the target attenuation spectrum at the corresponding operating wavelength.

In an embodiment of the present disclosure, the attenuation of the current attenuation spectrum at each wavelength may be adjusted by integrating an Arrayed Waveguide Grating (AWG) and a Variable Optical Attenuator (VOA) synthesizer, or a wavelength selective switch device based on a Wavelength Selectable Switch (WS S) or a Waveblocker, or a Programmable Logic Controller (PLC) based on a planar waveguide structure.

In the gain adjustment method provided by the embodiment of the present disclosure, the target attenuation spectrum corresponding to the target gain may be determined in the gain attenuation-spectrum mapping table by means of looking up the gain attenuation-spectrum mapping table or the interpolation method, and the attenuation value of the current attenuation spectrum of the dynamic gain equalizer at each operating wavelength is adjusted to the attenuation value of the target attenuation spectrum at the corresponding operating wavelength, so that the dynamic adjustment of the gain of the optical fiber amplifier may be achieved without reducing the pump conversion efficiency.

Figure 3:
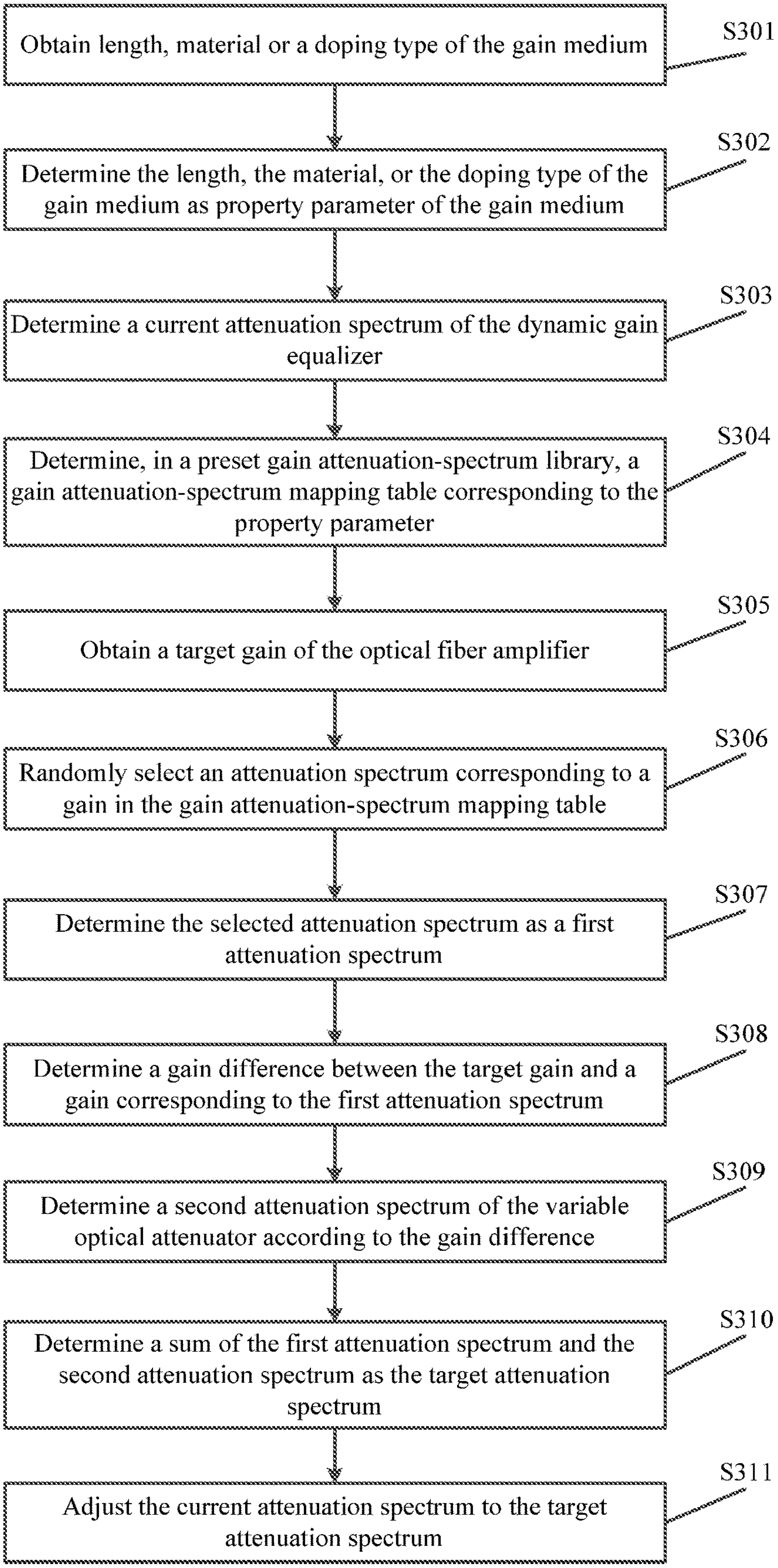
FIG. 3 is an optional schematic flowchart of a gain adjustment method provided by an embodiment of the present disclosure.

An embodiment of the present disclosure provides a gain adjustment method, which is applied to an optical fiber amplifier. The optical fiber amplifier at least includes: a gain medium, a dynamic gain equalizer, and a control unit, and the gain adjustment method is executed by the control unit. FIG. 3 is an optional schematic flowchart of the gain adjustment method provided by the embodiment of the present disclosure. As shown in FIG. 3, the method includes the steps of:

Step S301, obtaining length, material or a doping type of the gain medium.

In some embodiments, the obtaining length of the gain medium may be implemented by the following steps S3011 to S3014:

Step S3011, obtaining a first attenuation value of a current attenuation spectrum at a minimum operating wavelength, and a second attenuation value of the current attenuation spectrum at a maximum operating wavelength.

Step S3012, judging whether an absolute value of a difference between the first attenuation value and the second attenuation value is less than a threshold value.

In some embodiments, in a case that the absolute value of the difference between the first attenuation value and the second attenuation value is less than the threshold value, step S3013 is performed; in a case that the absolute value of the difference between the first attenuation value and the second attenuation value is greater than or equal to the threshold value, step S3011 is returned to be performed, wherein the threshold value may be 0.5 dB.

Step S3013, determining a gain corresponding to the current gain attenuation spectrum as a standard gain.

Herein, the standard gain is less than the maximum gain of the optical fiber amplifier, and is greater than the minimum gain of the optical fiber amplifier.

Step S3014, determining the length of the gain medium according to the standard gain.

In an embodiment of the present disclosure, in a case that the gain of the optical fiber amplifier is constant, the length of the gain medium of the optical fiber amplifier is also constant; that is, the length of the gain medium has a corresponding relationship with the gain of the optical fiber amplifier.

In some embodiments, the obtaining length of the gain medium may also be implemented by the following steps S3015 to S3018:

Step S3015, obtaining a third attenuation value at an attenuation peak in a first wavelength region of the current attenuation spectrum.

Step S3016, obtaining a fourth attenuation value at an attenuation peak in a second wavelength region of the current attenuation spectrum, wherein any wavelength in the first wavelength region is less than a minimum wavelength in the second wavelength region, Step S3017, judging whether an absolute value of a difference between the third attenuation value and the fourth attenuation value is less than a threshold value.

In a case that the absolute value of the difference between the third attenuation value and the fourth attenuation value is less than the threshold value, step S3018 is performed; and in a case that the absolute value of the difference between the third attenuation value and the fourth attenuation value is greater than or equal to the threshold value, step S3015 is returned to be performed, wherein the threshold value may be 0.5 dB.

Step S3018, determining a gain corresponding to the current gain attenuation spectrum as a standard gain, wherein the standard gain is less than a maximum gain of the optical fiber amplifier, and is greater than a minimum gain of the optical fiber amplifier;

Step S3019, determining the length of the gain medium according to the standard gain.

In the embodiments of the present disclosure, the gain of the optical fiber amplifier is adjusted under the standard gain, so that the noise of the optical fiber amplifier is lowest, the pump conversion efficiency is the highest, and the power consumption is lowest.

Step S302, determining the length, the material, or the doping type of the gain medium as property parameter of the gain medium.

In an embodiment of the present disclosure, the material of the gain medium may be quartz glass or plastic. The doping type of the gain medium may be bait-doped or thulium-doped.

Step S303, determining a current attenuation spectrum of the dynamic gain equalizer.

In an embodiment of the present disclosure, the current attenuation spectrum of the dynamic gain equalizer is determined by obtaining an attenuation value of the optical fiber amplifier at each operating wavelength at a current moment.

Step S304, determining, in a preset gain attenuation-spectrum library, a gain attenuation-spectrum mapping table corresponding to the property parameter, wherein the gain attenuation-spectrum mapping table stores a mapping relationship between each gain of the optical fiber amplifier and one attenuation spectrum of the dynamic gain equalizer.

Step S305, obtaining a target gain of the optical fiber amplifier.

Herein, the target gain is a gain that needs to be set, and it is less than the maximum gain of the optical fiber amplifier but is greater than the minimum gain of the optical fiber amplifier; that is, the target gain is any gain between the maximum gain and the minimum gain of the optical fiber amplifier.

Step S306, randomly selecting an attenuation spectrum corresponding to a gain in the gain attenuation-spectrum mapping table.

In some embodiments, the optical fiber amplifier further includes a variable optical attenuator; and the gain adjustment method provided in the embodiment of this application, in addition to using the dynamic gain equalizer to adjust the attenuation spectrum, may also dynamically adjust the gain at the same time combining with a VOA attenuation value of the variable optical attenuator; that is, a fractionated gain is adjusted by the change of the attenuation spectrum of the dynamic gain equalizer, and a fractionated gain is adjusted by the VOA attenuation value of the variable optical attenuator. At this time, the gain corresponding to the attenuation spectrum of the dynamic gain equalizer is less than the target gain.

Step S307, determining the selected attenuation spectrum as a first attenuation spectrum.

Step S308, determining a gain difference between the target gain and a gain corresponding to the first attenuation spectrum.

The gain difference is a difference between the target gain and the gain corresponding to the selected attenuation spectrum.

Step S309, determining a second attenuation spectrum of the variable optical attenuator according to the gain difference.

In an embodiment of the present disclosure, the fractionated gain corresponding to the gain difference of the optical fiber amplifier is adjusted by the VOA attenuation value of the variable optical attenuator, thus a fixed gain spectrum resulting from the VOA attenuation value of the variable optical attenuator is determined as the second attenuation spectrum.

Step S310, determining a sum of the first attenuation spectrum and the second attenuation spectrum as the target attenuation spectrum.

In some embodiments, the sum of the first attenuation spectrum and the second attenuation spectrum may be determined as the target attenuation spectrum by the following steps:

Step S3101, obtaining an attenuation value of the first attenuation spectrum at at least one operating wavelength and an attenuation value of the second attenuation spectrum at at least one operating wavelength.

Step S3102, determining the sum of the attenuation values corresponding to the first attenuation spectrum and the second attenuation spectrum at any operating wavelength as a target attenuation value of the target attenuation spectrum at the corresponding operating wavelength.

Step S3103, determining the target attenuation spectrum corresponding to the target gain according to the target attenuation value at each operating wavelength.

Step S311, adjusting the current attenuation spectrum to the target attenuation spectrum.

The implementation process and implemented functions of step S311 are the same as the implementation process and implemented functions of step S105 in the above embodiment.

The gain adjustment method provided by the embodiment of the present disclosure firstly determines the property parameter of the gain medium, and when the property parameter of the gain medium is optimal, the gain adjustment of the optical fiber amplifier is performed in combination with the dynamic gain equalizer and the variable optical attenuator, so that the dynamical adjustment of the gain of the optical fiber amplifier may be achieved without increasing the noise of the optical fiber amplifier or reducing the pump conversion efficiency.

An embodiment of the present disclosure provides a gain adjustment method, which is applied to an optical fiber amplifier. The optical fiber amplifier includes an erbium-doped optical fiber amplifier EDFA, a thulium-doped optical fiber amplifier and other rare earth-doped optical fiber amplifiers. The optical fiber amplifier includes: an input coupler, an isolator, a pump signal combiner, a doped (Er/Tm) optical fibers, an isolator, a dynamic gain equalizer (DGE), an output coupler, a pump laser set, an input photodetector and an output photodetector.

In an embodiment of the present disclosure, the way to adjust the gain of the optical fiber amplifier is that: flattening gains of the optical fiber amplifier at different gains is achieved by changing the attenuation values corresponding to different wavelengths of the dynamic gain equalizer at different gains, and then the gain adjustment of the whole optical fiber amplifier is achieved by the input/output power monitoring. The gain spectrums of the EDFA at different gains are coordinated and controlled by the control unit of the optical fiber amplifier. The corresponding relationship between the gain value and the attenuation spectrum of the dynamic gain equalizer is established at a step of 0.5 dB gain or other gain in the control unit. The control unit may achieve the attenuation spectrum of the dynamic gain equalizer corresponding to any gain within the gain adjustable range by means of table lookup or interpolation according to the set gain requirement.

Figure 4A:
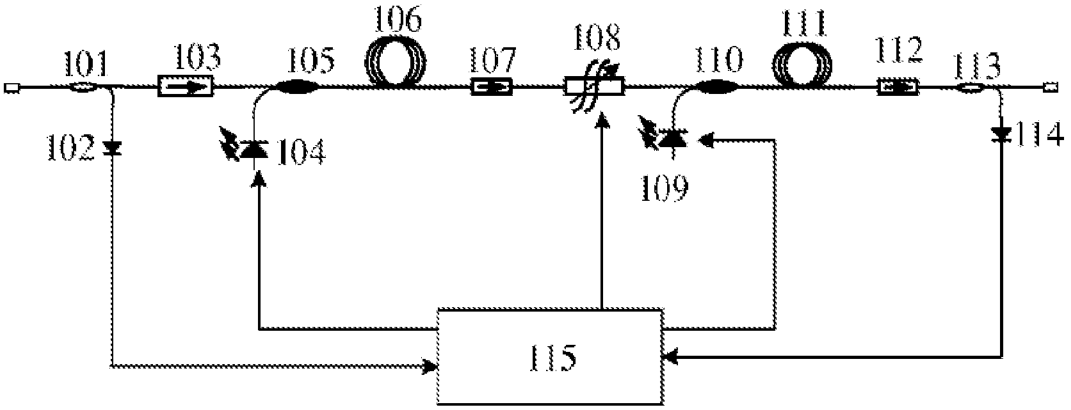
FIG. 4A is an optical structure diagram of an optical fiber amplifier provided by an embodiment of the present disclosure.

As shown in FIG. 4A, it is an optical structure diagram of an optical fiber amplifier provided by an embodiment of the present disclosure. The optical fiber amplifier includes: an input coupler 101, an input isolator 103, a doped optical fiber 106, an isolator 107, a dynamic gain equalizer 108, a doped optical fiber 111, an output isolator 112, an output coupler 113, an input photodetector 102 and an output photodetector 114 which are connected in sequence. The optical fiber amplifier further includes a control unit 115 for controlling according to an expected amplification requirement. A small splitting-ratio end of the input coupler 101 is connected with the input photodetector 102, and a great splitting-ratio end of the input coupler 101 is connected with an input end of the input isolator 103. An output end of the input isolator 103 is connect with a signal end of the pump signal multiplexer 105, and a pump end of the pump signal multiplexer 105 is connected with the pump laser 104. A common end of the pump signal multiplexer 105 is connected with one port of the first section gain medium 106, and the other port of the first gain medium 106 is connected with an input end of the isolator 107. An output end of the isolator 107 is connected with an input end of the dynamic gain equalizer 108, and an output end of the dynamic gain equalizer 108 is connected with a signal end of the pump/signal combiner 110. A pump end of the pump/signal combiner 110 is connected with the pump laser 109, a common end of the pump/signal combiner 110 is connected with one end of the second segment gain medium 111, and the other end of the second segment gain medium 111 is connected with an input end of the output isolator 112. An output end of the output isolator 112 is connected with a common end of the output coupler 113. A small splitting-ratio end of the output coupler 113 is connected with the output photodetector 114, and a great splitting-ratio end of the output coupler 113 is an output end of the optical fiber amplifier. The control unit 115 controls the gain of the amplifier according to the electrical signals of the input photodetector 102 and the output photodetector 114. At the same time, the control unit controls attenuation spectrums of the dynamic gain equalizer 108 according to the gain set by the amplifier, so as to achieve flat gains under different gain conditions.

In an embodiment of the present disclosure, the gain flatness under different gain conditions of the optical fiber amplifier is achieved by the control unit controlling different attenuation values of the dynamic gain equalizer at different wavelengths. Attenuation spectrums of the dynamic gain equalizer are different at different gains. The different attenuation spectrums are calibrated and stored in the control unit, and the attenuation spectrum is obtained by table lookup or calculation formulas in the actual control process.

In an embodiment of the present disclosure, the isolator 107 and the dynamic gain equalizer 108 which are located between the first gain medium 106 and the second gain medium 111 may be two independent devices, or a hybrid device formed by a combination of both.

In an embodiment of the present disclosure, the attenuation spectrums of the dynamic gain equalizer in the optical fiber amplifier at different gains are related to the length of the gain medium (doped optical fiber). In order to reduce the impact of the change of the gain spectrum of the dynamic gain equalizer on the noise figure and the gain fluctuation of the amplifier, a method for determining a design length of the gain medium (doped optical fiber) includes: selecting a certain gain (corresponding to the standard gain in the above-mentioned embodiment) between the minimum gain and maximum gain, so that within an operating wavelength range, the attenuation spectrum at the minimum operating wavelength is as identical as possible with the attenuation spectrum at the maximum operating wavelength, and the attenuation value is as low as possible; or, between the minimum gain and maximum gain, selecting a certain gain to enable the attenuation values of the gain spectrums at different attenuation peaks are as equal as possible within the operating wavelength range.

In an embodiment of the present disclosure, a gain adjustment interval of the optical fiber amplifier is [Gmin, Gmax]. Generally, a certain gain point in the middle of the minimum/maximum gain, not any gain point at any end of both ends, is selected to determine the optical fiber length of the gain medium. In a case of selecting the gain points at both ends to determine the optical fiber length, the spectrum of the dynamic gain equalizer changes too much, which has a great impact on the noise figure. The criterion for gain selection is to minimize variations in the gain spectrum depending on the optical fiber length of the gain medium determined by the selected gain.

Figure 4B:
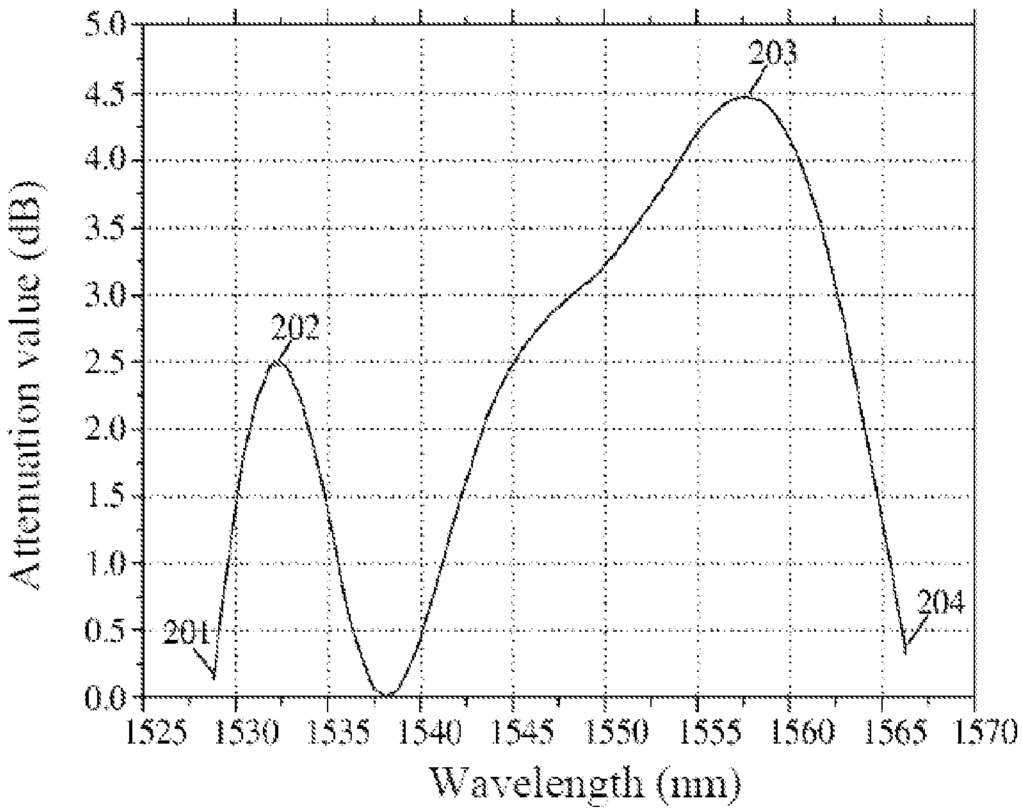
FIG. 4B is a spectrum of a gain flattening filter designed with an optical fiber length corresponding to a certain middle gain point provided by an embodiment of the present disclosure.

FIG. 4B is a gain flattening filter (GFF) spectrum designed with an optical fiber length corresponding to a certain gain point for an embodiment of the present disclosure, wherein the attenuation values of the GFF attenuation spectrums for the maximum operating wavelength and the minimum operating wavelength are approximately a minimum value (within about 0.5 dB). Point 201 and point 204 on the GFF attenuation spectrum in FIG. 4B are the attenuation values corresponding to the minimum operating wavelength and the maximum operating wavelength respectively, and point 202 and point 203 are respectively an attenuation peak point of a short wavelength region (corresponding to the first wavelength region in the above-mentioned embodiment) and an attenuation peak point of a long wavelength region (corresponding to the second wavelength region in the above embodiment). When the gain changes, the attenuation spectrum of the dynamic gain equalizer will also change. For example, for an EDFA with a gain adjustment interval of [Gmin, Gmax], the corresponding reference gain point when designing the optical fiber length is at Gm dB. With a fixed optical fiber length, the attenuation values of the GFF spectrums at the maximum and minimum operating wavelengths are approximately the minimum value (within about 0.5 dB), and the attenuation spectrums of the dynamic gain equalizer correlate with the gains (resulting in an excellent flatness effect).

Figure 4C:
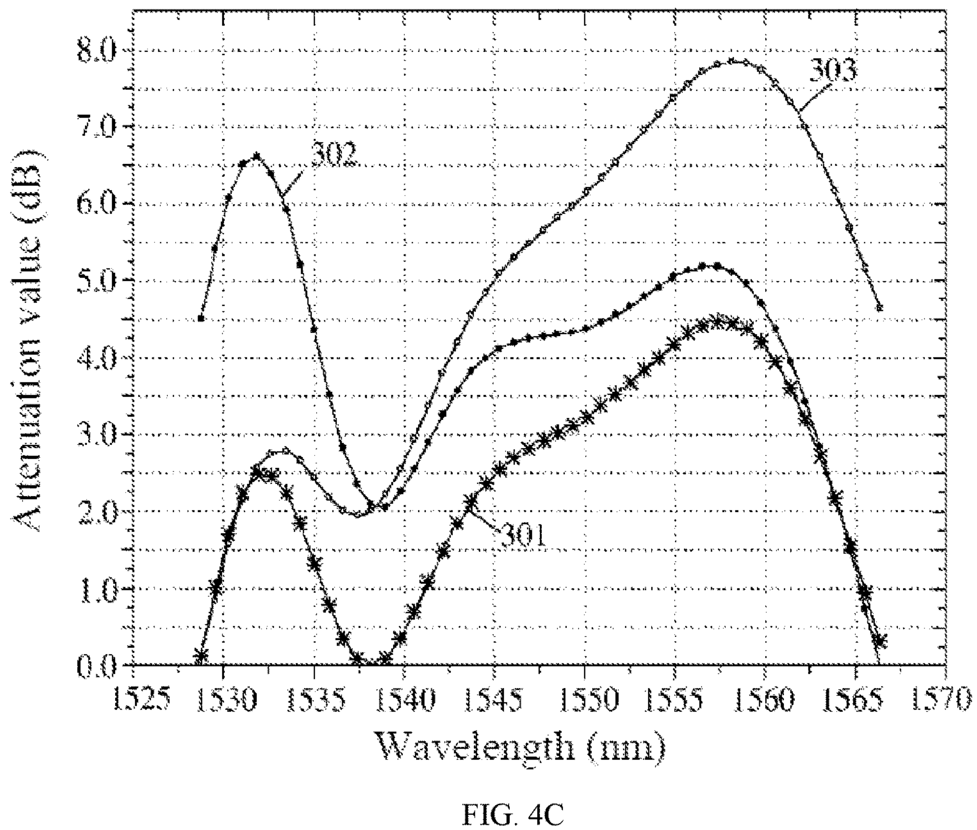
FIG. 4C is a schematic diagram of changes of an attenuation spectrum of a dynamic gain equalizer under different gains provided by an embodiment of the present disclosure.

FIG. 4C is a schematic diagram of changes of attenuation spectrums of a dynamic gain equalizer at different gains provided by an embodiment of the present disclosure. As shown in FIG. 4C, an attenuation spectrum 301 corresponds to a GFF attenuation spectrum line corresponding to an intermediate reference gain (corresponding to the standard gain in the above implementation), an attenuation spectrum 302 corresponds to a GFF attenuation spectrum line corresponding to the maximum gain, and an attenuation spectrum 303 corresponds to the GFF attenuation spectrum line corresponding to the minimum gain. Among all the GFF attenuation spectrum lines, the attenuation value of the GFF attenuation spectrum corresponding to the intermediate reference gain is the smallest, and the attenuation in the long-wavelength region will become greater when the gain becomes less, while the attenuation in the short-wavelength region will become greater when the gain becomes greater. Since the peak value of the GFF attenuation spectrum corresponding to the selected reference gain is not great, the attenuation value does not change much in the whole gain range, the noise figure is greatly optimized compared with conventional gain-adjustable amplifiers, and the conversion efficiency is also greatly improved.

Figure 4D:
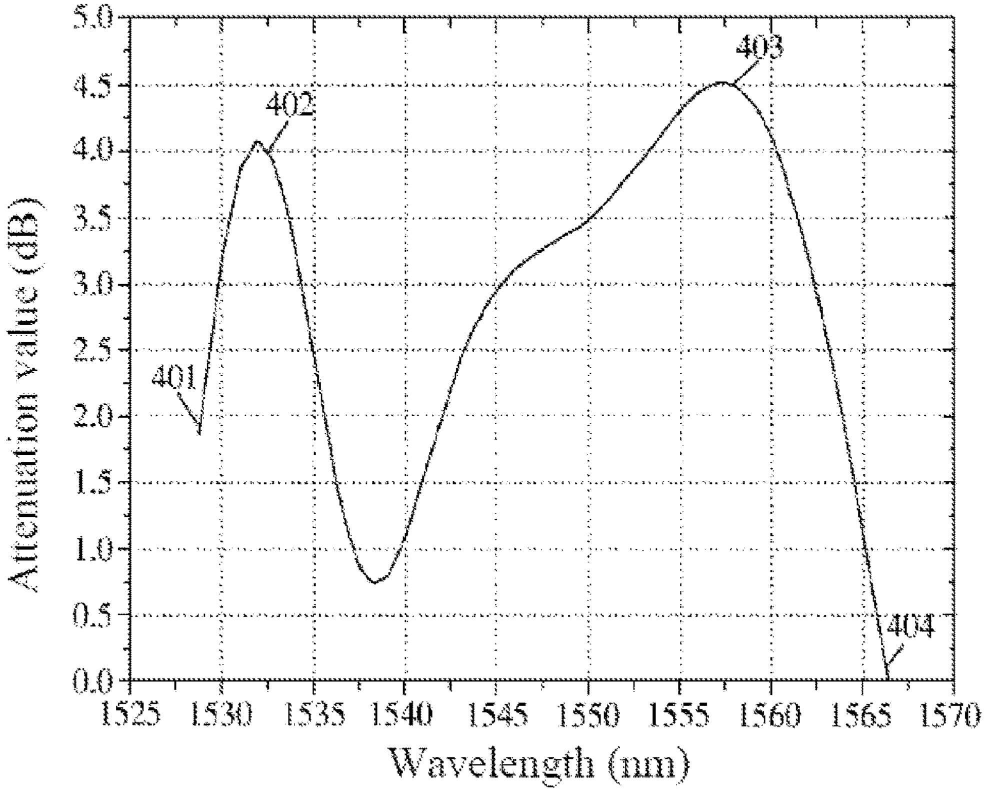
FIG. 4D is a spectrum of a gain flattening filter designed with an optical fiber length corresponding to a certain middle gain point provided by an embodiment of the present disclosure.

FIG. 4D is a gain flattening filter spectrum designed with an optical fiber length corresponding to a certain gain point provided by an embodiment of the present disclosure, wherein an attenuation peak in the short wavelength region is approximately equal to an attenuation peak in the long wavelength region (within about 0.5 dB). As shown in FIG. 4D, points 401 and 404 of the attenuation spectrum are attenuation values corresponding to the minimum and maximum operating wavelengths, respectively, and points 402 and 403 are an attenuation peak point in the short-wavelength region and an attenuation peak point in the long-wavelength region, respectively. In a case that the gain changes, the attenuation spectrum of the dynamic gain equalizer will also change. For example, for an EDFA with a gain adjustment range of [Gmin, Gmax], the corresponding reference gain point when designing the optical fiber length is selected at Gm dB. With a fixed optical fiber length, the attenuation of the minimum operating wavelength area and the maximum operating wavelength area are nearly equal (within about 0.5 dB), and the attenuation spectrum of the dynamic gain equalizer corresponds to the gain (resulting in an excellent flatness effect).

Figure 4E:
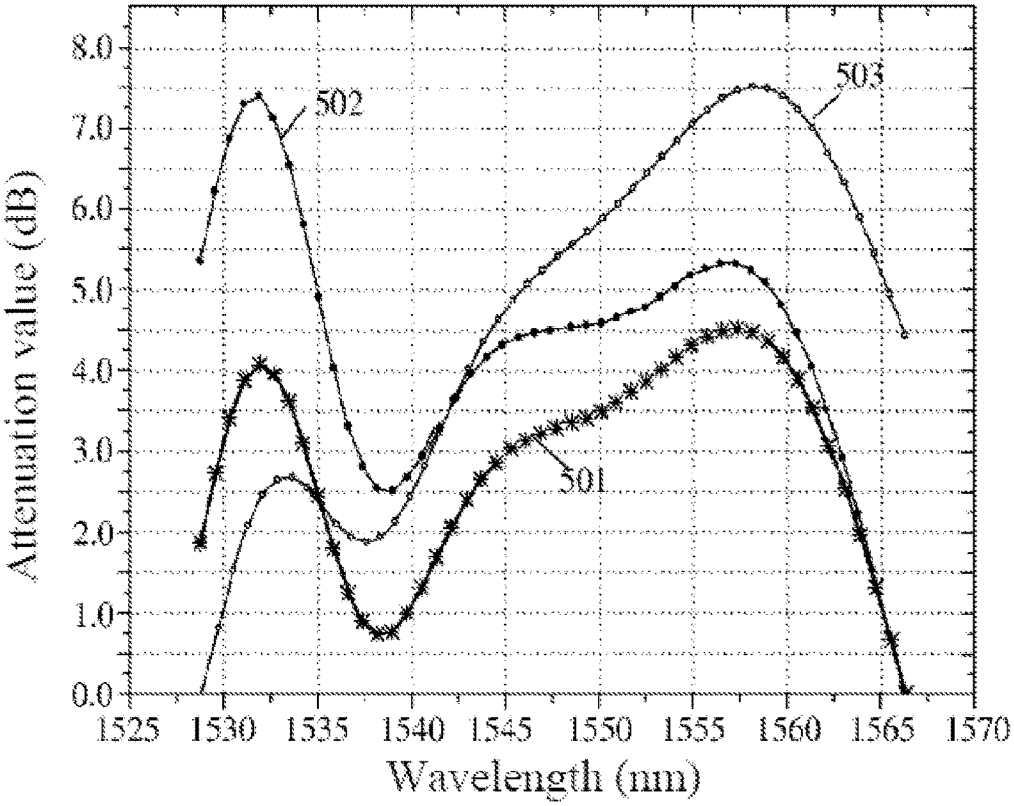
FIG. 4E is a schematic diagram of changes of an attenuation spectrum of a dynamic gain equalizer under different gains provided by an embodiment of the present disclosure.

FIG. 4E is a schematic diagram of changes of attenuation spectrums of the dynamic gain equalizer at different gains provided by an embodiment of the present disclosure. As shown in FIG. 4E, an attenuation spectrum 501 corresponds to a GFF attenuation line corresponding to an intermediate reference gain, an attenuation spectrum 502 corresponds to a GFF attenuation spectrum line corresponding to the maximum gain, and an attenuation spectrum 503 corresponds to a GFF attenuation spectrum line corresponding to the minimum gain.

Figure 4F:
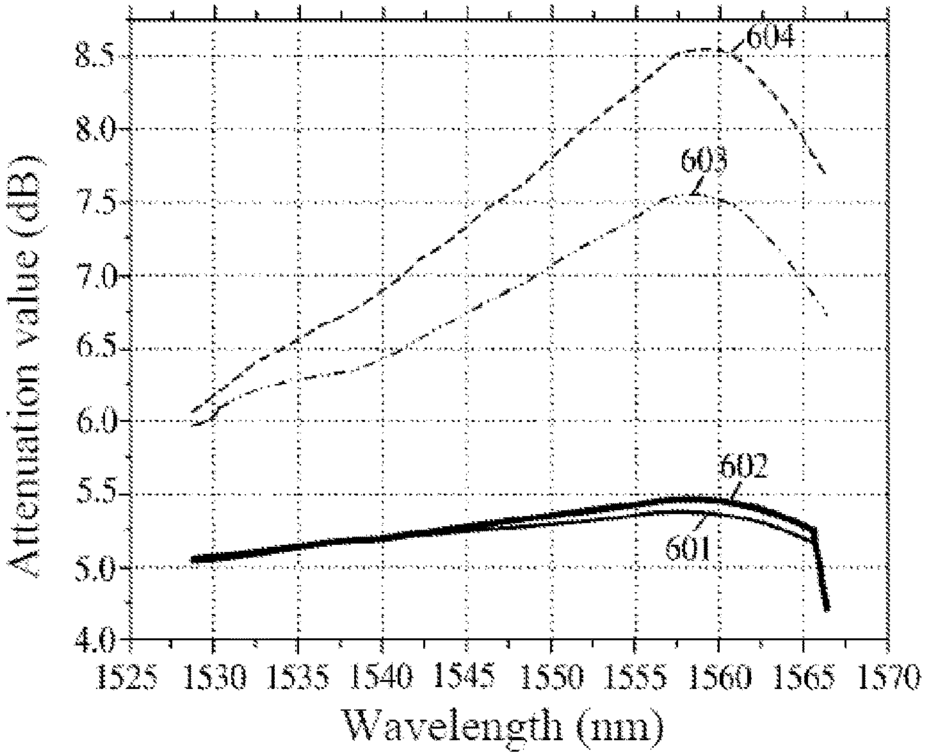
FIG. 4F is a comparison result of noise figures obtained at the minimum gain provided by an embodiment of the present disclosure.
Figure 4G:
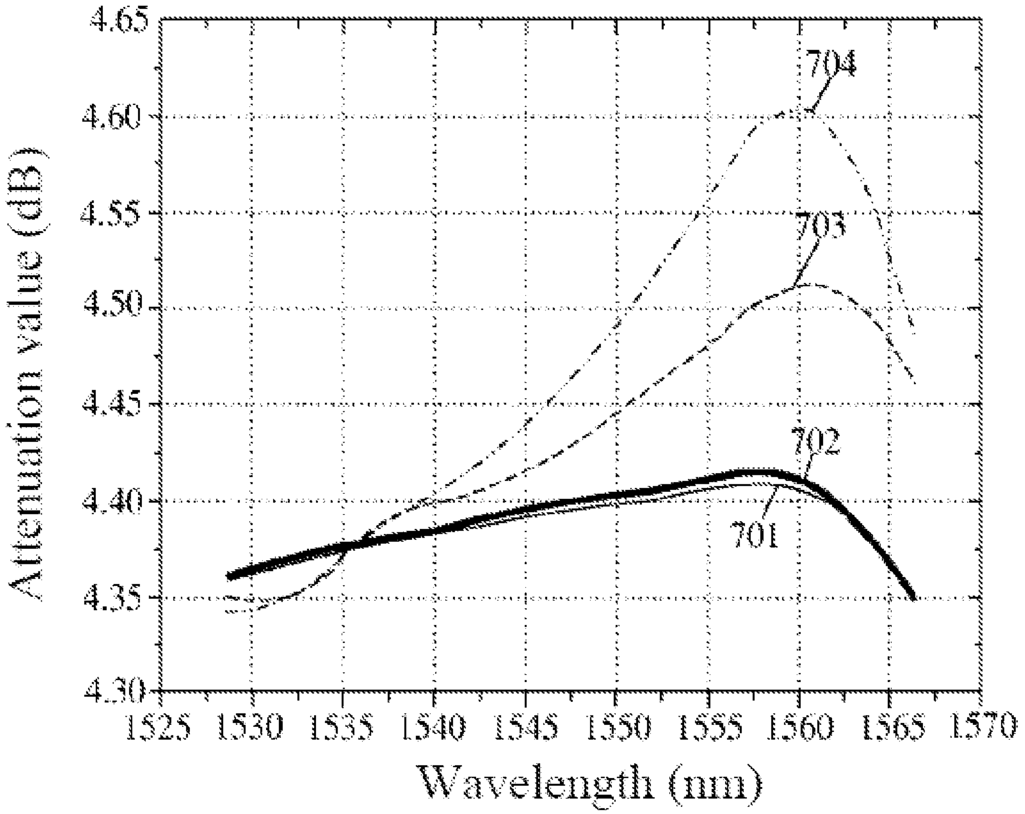
FIG. 4G is a comparison result of noise figures obtained at the maximum gain provided by an embodiment of the present disclosure.

In the related art, there are two implementation schemes for the gain adjustable amplifier: one is that the optical structure includes two sections of erbium-doped optical fiber, between of which there is VOA+GFF; the other is that the overall attenuation of VOA+GFF between two sections of the erbium-doped optical fiber is reduced, and VOA+GFF is separated, adopting three sections of erbium-doped optical fibers structure, so that VOA and GFF are respectively located between every two sections of erbium-doped optical fibers in the three sections of erbium-doped optical fibers. FIG. 4F is a comparison result of the noise figure obtained at the minimum gain provided by an embodiment of the present disclosure. As shown in FIG. 4F, a noise figure curve 601 is a noise figure spectrum line of the minimum gain obtained by a dynamic gain flattening filter when the attenuation in the long wavelength region and the short wavelength region is approximately 0; a noise figure curve 602 is a noise figure spectrum line of the minimum gain obtained by a dynamic GFF when the attenuation peaks in the long wavelength region and the short wavelength region are approximately the same; a noise figure curve 603 is a noise figure spectrum line at the minimum gain after the optimization of the three-section-optical-fiber noise figure of the three sections of optical fiber of the traditional gain adjustable amplifier; and a noise figure curve 604 is a noise figure spectrum line at the minimum gain of the two-section optical fibers of the traditional gain adjustable amplifier. FIG. 4G is a comparison result of the noise figure obtained at the maximum gain provided by an embodiment of the present disclosure. As shown in FIG. 4G, a noise figure curve 701 is a noise figure spectrum line of the maximum gain obtained by a dynamic GFF when the attenuation at the maximum operating wavelength and the attenuation at the minimum operating wavelength are approximately 0; a noise figure curve 702 is a noise figure spectrum line of the maximum gain obtained by a dynamic GFF when the attenuation peaks in the long wavelength region and the short wavelength region are approximately the same; a noise figure curve 703 is a noise figure spectrum line at the maximum gain after the optimization of the three-section-optical-fiber noise figure of the traditional gain adjustable amplifier; and a noise figure curve 704 is a noise figure spectrum line at the maximum gain of the two section of optical fibers of the traditional gain adjustable amplifier.

Comparing with the noise figures, it is found that the noise figure of the gain adjustable optical fiber amplifier applied in the gain adjustment method provided in an embodiment of the present disclosure is significantly optimized that is compared with the gain adjustment method in the related art.

In addition, an embodiment of the present disclosure also provides a gain adjustment method, which is applied to a dynamic gain equalizer and a traditional gain adjustable amplifier, so as to implement a gain adjustable optical fiber amplifier with low noise and an adjustable ultra-great dynamic gain range. The gain adjustable optical fiber amplifier adds a variable optical attenuator and a fixed gain flat filter (corresponding to the dynamic gain equalizer in an embodiment of the application), and the added variable optical attenuator and the fixed gain flat filter may be connected together or separated in the optical structure. If a lower noise figure is desired, the two devices are separated and an additional stage of amplification is introduced. A gain adjustment method provided in an embodiment of the present disclosure includes the following steps.

At Step S401, after taking a fixed gain GFF into account, a certain gain is selected within an adjustment range of a dynamic gain flat filter, so that within the operating wavelength range, attenuation spectrums at a minimum operating wavelength and a maximum operating wavelength are as equal as possible and the attenuation values at the minimum operating wavelength and the maximum operating wavelength are as little as possible; or, within an adjustment range of the dynamic gain flattening filter, a certain gain is selected, so that the attenuation values at different attenuation peaks of the gain spectrum are as similar as possible within the operating wavelength range.

At Step S402, overall attenuation spectrums of the GFF=attenuation spectrums of the fixed GFF+spectrums of a dynamic gain equalizer at different gains.

At Step S403, in an amplifier gain interval [Gmin, Gmax], a certain gain Gx in the middle is selected; a gain adjustment of the amplifier is implemented by changing the spectrum of the dynamic gain equalizer within the gain interval [Gmin, Gx], and an attenuation value of the VOA keeps Gmax-Gx unchanged; and in a case that the gain setting value is greater than Gx, that is, within the gain interval [Gx, Gmax], a gain spectrum of the dynamic gain equalizer maintains the spectrum when the gain is Gx, while the adjustment of the gain of the amplifier is implemented by adjusting the attenuation value of the VOA.

At Step S404, in the amplifier gain interval [Gmin, Gmax], a certain gain Gx in the middle is selected, the gain adjustment is implemented by changing the attenuation value of the VOA within the gain interval [Gmin, Gx], and the attenuation range of the VOA is from 0 to Gx-Gmin. In a case that the gain is set to the minimum, the maximum attenuation value of the VOA is Gx-Gmin. In a case that the gain is set to Gx, the attenuation value of the VOA is 0. The gain spectrum of the dynamic gain equalizer remains 0 unchanged during a VOA adjustment process; and in a case that the set gain is greater than Gx, that is, within the gain interval [Gx, Gmax], the attenuation value of the VOA remains 0 unchanged, and the gain adjustment of the amplifier is implemented by adjusting the gain spectrum of the dynamic gain equalizer.

In an embodiment of the present disclosure, the built-in dynamic gain equalizer of the EDFA can also optimize the overall signal power flatness of the cascaded amplifier system, and optimize the optical signal-to-noise ratio of the transmission system.

In an embodiment of the present disclosure, the gain flatness of an amplifier at different gains is implemented by controlling the shape of the attenuation spectrum of the dynamic gain equalizer, and then a gain-adjustable optical fiber amplifier is implemented. Compared with the traditional gain adjustable optical fiber amplifier, the gain adjustable optical fiber amplifier implemented by an embodiment of the present disclosure has the characteristics of low noise, high pump conversion efficiency and low power consumption.

Figure 5:
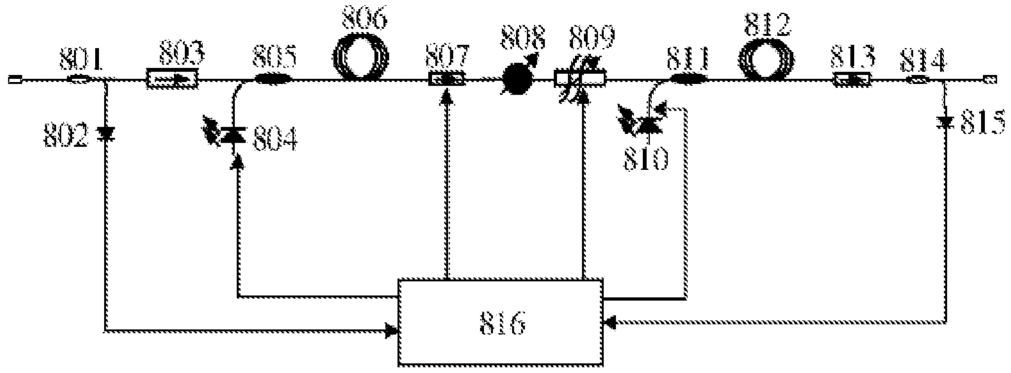
FIG. 5 is an optical structure diagram of an optical fiber amplifier provided by an embodiment of the present disclosure.

An embodiment of the present disclosure also provides an optical fiber amplifier. FIG. 5 is a schematic diagram of an optical structure of an optical fiber amplifier provided in an embodiment of the present disclosure. As shown in FIG. 5, the optical fiber amplifier at least includes a gain medium, a dynamic gain equalizer 809 and a control unit 816.

An input end of the dynamic gain equalizer 809 is connected with the gain medium. In an embodiment of the present disclosure, the gain medium includes a first section of gain medium 806 and a second section of gain medium 812. The dynamic gain equalizer 809 is located between the first gain medium 806 and the second gain medium 812. The dynamic gain equalizer 809 is configured to adjust the gain attenuation spectrum of the optical fiber amplifier.

The control unit 816 is connected with the dynamic gain equalizer 809, and is configured to determine a property parameter of the gain medium and a current attenuation spectrum of the dynamic gain equalizer; determine, in a preset gain attenuation-spectrum library, a gain attenuation-spectrum mapping table corresponding to the property parameter, wherein the gain attenuation-spectrum mapping table includes a mapping relationship between each gain of the optical fiber amplifier and one attenuation spectrum of the dynamic gain equalizer; obtain a target gain of the optical fiber amplifier; determine a target attenuation spectrum in the gain attenuation-spectrum mapping table according to the target gain; and adjust the current attenuation spectrum to the target attenuation spectrum.

In some embodiments, the control unit 816 is further configured to, in a case that the target gain is found in the gain attenuation-spectrum mapping table, determine an attenuation spectrum corresponding to the target gain in the gain attenuation-spectrum mapping table as the target attenuation spectrum.

In some embodiments, the control unit 816 is further configured to, in a case that the target gain is not found in the gain attenuation-spectrum mapping table, determine a position of the target gain in the gain attenuation-spectrum mapping table; obtain at least one adjacent gain adjacent to the target gain and an attenuation spectrum corresponding to each adjacent gain according to the position of the target gain; and determine the target attenuation spectrum corresponding to the target gain according to the at least one adjacent gain and the attenuation spectrum corresponding to each adjacent gain by using an interpolation method.

In some embodiments, the control unit 816 is further configured to determine at least one operating wavelength of the attenuation spectrum corresponding to each adjacent gain and an attenuation value corresponding to each operating wavelength; determine an average value of the attenuation values corresponding to different attenuation spectrums at a same operating wavelength as a target attenuation value of the target attenuation spectrum at the corresponding operating wavelength; and determine the target attenuation spectrum corresponding to the target gain according to the target attenuation value at each operating wavelength.

In some embodiments, the control unit 816 is further configured to obtain length, material or a doping type of the gain medium; and determine the length, the material or the doping type of the gain medium as the property parameter of the gain medium In some embodiments, the control unit 816 is further configured to obtain a first attenuation value of the current attenuation spectrum at a minimum operating wavelength and a second attenuation value of the current attenuation spectrum at a maximum operating wavelength; in a case that an absolute value of a difference between the first attenuation value and the second attenuation value is less than a threshold value, determine a gain corresponding to the current gain attenuation spectrum as a standard gain, wherein the standard gain is less than a maximum gain of the optical fiber amplifier but is greater than a minimum gain of the optical fiber amplifier; and determine the length of the gain medium according to the standard gain.

In some embodiments, the control unit 816 is further configured to obtain a third attenuation value at an attenuation peak in a first wavelength region of the current attenuation spectrum; obtain a fourth attenuation value at an attenuation peak in a second wavelength region of the current attenuation spectrum, wherein any wavelength in the first wavelength region is less than a minimum wavelength in the second wavelength region; in a case that an absolute value of a difference between the third attenuation value and the fourth attenuation value is less than a threshold value, determine a gain corresponding to the current gain attenuation spectrum as a standard gain, wherein the standard gain is less than a maximum of the optical fiber amplifier gain but is greater than a minimum gain of the optical fiber amplifier; and determine the length of the gain medium according to the standard gain.

In some embodiments, the control unit 816 is further configured to determine the target attenuation value of the target attenuation spectrum at each operating wavelength; and adjust an attenuation value of the current attenuation spectrum at each operating wavelength to the target attenuation value at the corresponding operating wavelength in the target attenuation spectrum, so as to adjust the current attenuation spectrum to the target attenuation spectrum.

In some embodiments, the optical fiber amplifier further includes: a variable optical attenuator 808 located between the gain medium 806 and the dynamic gain equalizer 809. The control unit 816 is further configured to select randomly an attenuation spectrum corresponding to a gain in the gain attenuation-spectrum mapping table, wherein the gain corresponding to the selected attenuation spectrum is less than the target gain; determine the selected attenuation spectrum as a first attenuation spectrum; determine a gain difference between the target gain and the gain corresponding to the first attenuation spectrum; determine a second attenuation spectrum of the variable optical attenuator according to the gain difference; and determine a sum of the first attenuation spectrum and the second attenuation spectrum as the target attenuation spectrum.

In some embodiments, the optical fiber amplifier further includes: an input coupler 801, an input photodetector 802, an input isolator 803, a pump laser 804/810, a pump/signal combiner 805/811, an isolator 807, an output isolator 813, an output coupler 814 and an output photodetector 815. A small splitting-ratio end of the input coupler 801 is connected with the input photodetector 802, and a great splitting-ratio end of the input coupler 801 is connected with an input end of the input isolator 803; an output end of the input isolator 803 is connected with a signal end of the pump signal multiplexer 805, and a pump end of the pump signal multiplexer 805 is connected with the pump laser 804; a common end of the pump signal multiplexer 805 is connected with one end of the first gain medium 806, and the other end of the first gain medium 806 is connected to an input end of the isolator 807; an output end of the isolator 807 is connected with an input end of the adjustable optical amplifier 808, and an output end of the adjustable optical amplifier 808 is connected with an input end of the dynamic gain equalizer 809; an output end of the dynamic gain equalizer 809 is connected with a signal end of the pumping/signal multiplexer 811, and a pump end of the pumping/signal multiplexer 811 is connected with the pump laser 810; and a common end of the pump/signal combiner 811 is connected with one end of the second gain medium 812, and the other end of the second gain medium 812 is connected with an input end of the output isolator 813; an output end of the output isolator 813 is connected with a common end of the output coupler 814, a small splitting-ratio end of the output coupler is connected with the output photodetector 815, and a great splitting-ratio end of the output coupler 814 is an output end of the amplifier.

The optical fiber amplifier provided by the embodiment of the present disclosure at least has a dynamic gain equalizer and a control unit, wherein the dynamic gain equalizer may be control to adjust to different gain spectrum under the control of the control unit, and the gain of the optical amplifier may be adjust by the dynamic gain equalizer.

In the several embodiments provided in this application, it should be understood that the disclosed devices and methods may be implemented in other ways. The above embodiments of the device are schematic, for example, the division of the units, which is only a logical function division, may be split in other ways in actual implementation, e.g. multiple units or components may be combined or may be integrate into another system, or some features may be ignored or not implemented. In addition, the coupling, or direct coupling, or communication connection between the components shown or discussed may be indirect coupling or communication connection by some interfaces, devices or units, and may be electrical, mechanical or other forms.

The units described above as separate components may or may not be physically separated, and the components displayed as units may or may not be physical units, that is, they may be located in one place or distributed over multiple network units; a part of or all of the units may be selected according to actual needs to achieve the purpose of the implementation.

In addition, each functional unit in each embodiment of the present disclosure may be integrated into one processing module, or each unit may be used as a single unit, or two or more units may be integrated into one unit; the above integration unit may be implemented in the form of hardware or in the form of hardware plus software functional unit. Those of ordinary skill in the art may understand that all or part of the steps for implementing the foregoing method embodiments may be completed by hardware related to program instructions, and the foregoing program may be stored in a computer-readable storage medium. When executed, the program executes the steps including the foregoing method embodiments; and the foregoing storage medium includes: a mobile storage device, a read-only memory (ROM), a random access memory (RAM), a magnetic disk, or an optical disc.

The methods disclosed in several method embodiments provided in the present disclosure may be combined arbitrarily to obtain new method embodiments without conflict.

The features disclosed in several product embodiments provided in the present disclosure may be combined arbitrarily without conflict to obtain new product embodiments.

The features disclosed in several method or device embodiments provided in the present disclosure may be combined arbitrarily without conflict to obtain new method embodiments or device embodiments.

The above is only part of the implementation of the present disclosure, but the scope of protection of the present is not limited thereto. Any person skilled in the art may easily think of changes or substitutions within the technical scope disclosed in the present disclosure, and which should be covered within the protection scope of the present disclosure. Therefore, the protection scope of the present disclosure should be subject to the protection scope of the claims.

INDUSTRIAL APPLICABILITY

In the embodiments of the present disclosure, when the gain of the optical fiber amplifier needs to be adjusted, it is possible to obtain the target gain of the optical fiber amplifier by determining the property parameter of the gain medium and the current attenuation spectrum of the dynamic gain equalizer; and determine, in the preset gain attenuation-spectrum library, the gain attenuation-spectrum mapping table corresponding to the property parameter; and determine the target attenuation spectrum in the gain attenuation-spectrum mapping table according to the target gain; and adjust the current attenuation spectrum to the target attenuation spectrum, so that the gain of the optical fiber amplifier can be dynamically adjusted without reducing the pump conversion efficiency, which is of great industrial applicability.

What is claimed is:

1. A gain adjustment method, which is applied to an optical fiber amplifier at least comprising a gain medium, a dynamic gain equalizer, and a control unit, wherein the method is performed by the control unit, and comprises:

determining a property parameter of the gain medium and a current attenuation spectrum of the dynamic gain equalizer;

determining a gain attenuation-spectrum mapping table corresponding to the property parameter in a preset gain attenuation-spectrum library; wherein the gain attenuation-spectrum mapping table includes a mapping relationship between each gain of the optical fiber amplifier and one attenuation spectrum of the dynamic gain equalizer;

obtaining a target gain of the optical fiber amplifier;

determining a target attenuation spectrum in the gain attenuation-spectrum mapping table according to the target gain; and adjusting the current attenuation spectrum to the target attenuation spectrum.

2. The method according to claim 1, wherein the determining the target attenuation spectrum in the gain attenuation-spectrum mapping table according to the target gain comprises:

determining an attenuation spectrum corresponding to the target gain in the gain attenuation-spectrum mapping table as the target attenuation spectrum in a case that the target gain is found in the gain attenuation-spectrum mapping table.

3. The method according to claim 1, wherein the determining the target attenuation spectrum in the gain attenuation-spectrum mapping table according to the target gain comprises:

determining a position of the target gain in the gain attenuation-spectrum mapping table in a case that the target gain is not found in the gain attenuation-spectrum mapping table;

obtaining at least one adjacent gain adjacent to the target gain and an attenuation spectrum corresponding to each adjacent gain according to the position of the target gain; and determining the target attenuation spectrum corresponding to the target gain according to the at least one adjacent gain and the attenuation spectrum corresponding to each adjacent gain by using an interpolation method.

4. The method according to claim 3, wherein the determining the target attenuation spectrum corresponding to the target gain according to the at least one adjacent gain and the attenuation spectrum corresponding to each adjacent gain by using an interpolation method comprises:

determining at least one operating wavelength of the attenuation spectrum corresponding to each adjacent gain and an attenuation value corresponding to each operating wavelength;

determining an average value of the attenuation values corresponding to different attenuation spectrums at a same operating wavelength as a target attenuation value of the target attenuation spectrum at the corresponding operating wavelength; and determining the target attenuation spectrum corresponding to the target gain according to the target attenuation value at each operating wavelength.

5. The method according to claim 1, wherein the determining a property parameter of the gain medium comprises:

obtaining length, material or a doping type of the gain medium; and determining the length, the material or the doping type of the gain medium as the property parameter of the gain medium.

6. The method according to claim 5, wherein the obtaining length of the gain medium comprises:

obtaining a first attenuation value of the current attenuation spectrum at a minimum operating wavelength, and a second attenuation value of the current attenuation spectrum at a maximum operating wavelength;

in a case that an absolute value of a difference between the first attenuation value and the second attenuation value is less than a threshold value, determining a gain corresponding to the current gain attenuation spectrum as a standard gain, wherein the standard gain is less than the maximum gain of the optical fiber amplifier, and the standard gain is greater than the minimum gain of the optical fiber amplifier; and determining the length of the gain medium according to the standard gain.

7. The method according to claim 5, wherein the obtaining length of the gain medium comprises:

obtaining a third attenuation value at an attenuation peak in a first wavelength region of the current attenuation spectrum;

obtaining a fourth attenuation value at an attenuation peak in a second wavelength region of the current attenuation spectrum, wherein any wavelength in the first wavelength region is less than a minimum wavelength in the second wavelength region;

in a case that an absolute value of a difference between the third attenuation value and the fourth attenuation value is less than a threshold value, determining a gain corresponding to the current gain attenuation spectrum as a standard gain, wherein the standard gain is less than a maximum of the optical fiber amplifier gain, and the standard gain is greater than a minimum gain of the optical fiber amplifier; and determining the length of the gain medium according to the standard gain.

8. The method according to claim 4, wherein the adjusting the current attenuation spectrum to the target attenuation spectrum comprises:

determining the target attenuation value of the target attenuation spectrum at each operating wavelength;

adjusting an attenuation value of the current attenuation spectrum at each operating wavelength to the target attenuation value of the target attenuation spectrum at the corresponding operating wavelength, so as to adjust the current attenuation spectrum to the target attenuation spectrum.

9. The method according to claim 1, wherein the optical fiber amplifier further comprises: a variable optical attenuator; and the determining the target attenuation spectrum in the gain attenuation-spectrum mapping table according to the target gain includes:

selecting randomly an attenuation spectrum corresponding to a gain in the gain attenuation-spectrum mapping table, wherein the gain corresponding to the selected attenuation spectrum is less than the target gain;

determining the selected attenuation spectrum as a first attenuation spectrum;

determining a gain difference between the target gain and a gain corresponding to the first attenuation spectrum;

determining a second attenuation spectrum of the variable optical attenuator according to the gain difference; and determining a sum of the first attenuation spectrum and the second attenuation spectrum as the target attenuation spectrum.

10. An optical fiber amplifier, at least comprising: a gain medium, a dynamic gain equalizer and a control unit;

an input end of the dynamic gain equalizer being connected with the gain medium, and the dynamic gain equalizer being configured to adjust a gain attenuation spectrum of the optical fiber amplifier;

the control unit being connected with the dynamic gain equalizer for determining a property parameter of the gain medium and a current attenuation spectrum of the dynamic gain equalizer; determining, in a preset gain attenuation-spectrum library, a gain attenuation-spectrum mapping table corresponding to the property parameter, wherein the gain attenuation-spectrum mapping table includes a mapping relationship between each gain of the optical fiber amplifier and an attenuation spectrum of the dynamic gain equalization; obtaining a target gain of the optical fiber amplifier; determining a target attenuation spectrum in the gain attenuation-spectrum mapping table according to the target gain; and adjusting the current attenuation spectrum to the target attenuation spectrum.

* * * * *